(12) United States Patent
Banerjee

(10) Patent No.: US 8,531,182 B2
(45) Date of Patent: Sep. 10, 2013

(54) CONTROL SYSTEM AND METHOD FOR PROVIDING POSITION MEASUREMENT WITH REDUNDANCY FOR SAFETY CHECKING

(75) Inventor: Dev Kumar Banerjee, Shirley (GB)

(73) Assignee: Penny & Giles Controls Limited (GB)

( * ) Notice: Subject to any disclaimer, the term of this patent is extended or adjusted under 35 U.S.C. 154(b) by 375 days.

(21) Appl. No.: 12/142,213

(22) Filed: Jun. 19, 2008

(65) Prior Publication Data

US 2008/0315866 A1    Dec. 25, 2008

(30) Foreign Application Priority Data

Jun. 20, 2007   (GB) .................................. 0711874.8

(51) Int. Cl.
*G01B 7/30* (2006.01)
(52) U.S. Cl.
USPC ............ 324/207.25; 324/207.11; 324/207.12; 324/207.13; 324/207.14; 324/207.15; 324/207.16; 324/207.18; 324/207.19; 324/207.2; 324/207.21; 324/207.22; 324/207.23; 324/207.24; 324/207.26; 324/160; 324/161; 324/162; 324/163; 324/164; 324/165; 324/166; 324/167; 324/168; 324/169; 324/170; 324/171; 324/172; 324/173; 324/174; 324/175; 324/176; 324/177; 324/178; 324/179; 324/180; 341/35; 341/32; 74/63; 345/156; 345/157; 345/158; 345/167; 345/184; 455/575.2; 455/575.4; 455/556.1; 455/556.2; 455/550.1; 335/205; 335/207
(58) Field of Classification Search
USPC ................. 341/35, 32; 74/63; 345/156, 157, 345/158, 167, 184, 156.157; 324/207.11–207.26, 160–180; 455/575.2, 455/575.4, 556.1, 556.2, 550.1; 335/205, 335/207
See application file for complete search history.

(56) References Cited

U.S. PATENT DOCUMENTS

| 4,146,824 | A | * | 3/1979 | Flint et al. ......................... 318/7 |
| 5,168,221 | A | * | 12/1992 | Houston ................... 324/207.13 |
| 5,831,596 | A | * | 11/1998 | Marshall et al. .............. 345/161 |
| 5,969,520 | A | * | 10/1999 | Schottler ..................... 324/207.2 |
| 6,259,433 | B1 | * | 7/2001 | Meyers ......................... 345/161 |
| 6,479,768 | B1 | * | 11/2002 | How ........................... 178/19.03 |
| 6,489,946 | B1 | * | 12/2002 | Takeda et al. .................. 345/161 |
| 7,307,416 | B2 | * | 12/2007 | Islam et al. .............. 324/207.25 |
| 7,319,320 | B2 | * | 1/2008 | Kawashima et al. ..... 324/207.25 |
| 7,550,965 | B2 | * | 6/2009 | Miller ....................... 324/207.25 |
| 8,305,073 | B2 | * | 11/2012 | Kather ...................... 324/207.25 |
| 2002/0024503 | A1 | * | 2/2002 | Armstrong ..................... 345/167 |

(Continued)

FOREIGN PATENT DOCUMENTS

| EP | 1422492 A1 | 5/2004 |
| GB | 2416826 A | 2/2006 |
| JP | 11011869 A | 1/1999 |

*Primary Examiner* — Arleen M Vazquez
*Assistant Examiner* — Lamarr Brown
(74) *Attorney, Agent, or Firm* — Waddey & Patterson, P.C.; Emily A. Shouse; Gary L. Montle

(57) ABSTRACT

A control system for use in safety critical human/machine control interfaces is described, more particularly a joystick type control system and particularly a joystick type control system utilizing magnetic positional sensing. The control system provides a control input device having a movable magnet, a pole-piece frame arrangement positioned about the magnet, at least three magnetic flux sensors being positioned in said pole-piece frame arrangement and a monitoring arrangement for monitoring the output signal of each of said at least three sensors.

11 Claims, 4 Drawing Sheets

(56) References Cited

U.S. PATENT DOCUMENTS

| | | | |
|---|---|---|---|
| 2004/0067783 A1* | 4/2004 | Lenchik et al. | 455/575.1 |
| 2004/0239313 A1* | 12/2004 | Godkin | 324/207.2 |
| 2005/0162389 A1* | 7/2005 | Obermeyer et al. | 345/161 |
| 2005/0264282 A1* | 12/2005 | Kawashima et al. | 324/207.25 |
| 2006/0010700 A1* | 1/2006 | Sakurai et al. | 33/355 R |
| 2006/0028184 A1* | 2/2006 | Lewis et al. | 322/3 |
| 2006/0028203 A1* | 2/2006 | Kawashima et al. | 324/207.25 |
| 2007/0268250 A1* | 11/2007 | Min | 345/158 |
| 2008/0048650 A1* | 2/2008 | Islam et al. | 324/207.2 |
| 2008/0111541 A1* | 5/2008 | Miller | 324/207.16 |
| 2008/0174550 A1* | 7/2008 | Laurila et al. | 345/158 |
| 2009/0267594 A1* | 10/2009 | Kather | 324/207.25 |
| 2011/0084902 A1* | 4/2011 | Logue | 345/157 |
| 2011/0221677 A1* | 9/2011 | Cavacuiti et al. | 345/167 |

* cited by examiner

CONTROL SYSTEM AND METHOD FOR PROVIDING POSITION MEASUREMENT WITH REDUNDANCY FOR SAFETY CHECKING

I, Dev Kumar Banerjee, a citizen of United Kingdom, residing in the United Kingdom; have invented a new and useful "Control System and Method for Providing Position Measurement with Redundancy for Safety Checking."

CROSS-REFERENCES TO RELATED APPLICATIONS

This application is a Non-Provisional Utility application which claims benefit of UK Patent Application No. 0711874.8 filed Jun. 20, 2007, entitled "Control System" which is hereby incorporated by reference.

BACKGROUND OF THE INVENTION

The present invention relates to a control system and more particularly to a joystick type control system, and particularly to such systems utilizing magnetic positional sensing used in safety critical human/machine control interfaces.

Typical uses for such control systems include wheelchairs, forklift trucks or other man-carrying vehicles, and control of machines such as cranes, robots or other industrial equipment where a dangerous situation could be created in the event of a control system failure. In such a system, dual joystick position sensor channels may be used, and the outputs compared to one another continuously. This ensures that if there is a problem with one of the sensor channels, the error is identified due to a mismatch in the outputs at the two channels. If a discrepant output (differential beyond a predetermined threshold) occurs, the control system is configured to rapidly and safely disable the system.

Due to the fact that the two sensors in each fail-safe pair cannot occupy exactly the same position in space, and due to the small differences in calibration that will occur between them, the outputs from the sensors in the pair will differ slightly and allowance must be made for this when setting the system permissible differential tolerance threshold. The sensors are typically programmable, allowing each pair to be calibrated to provide a nominally zero difference in output from each sensor of the pair, under normal operating conditions. However, if the threshold is too small then the monitoring system may indicate a malfunction when creating 'false errors' or 'nuisance trips' as known in the art.

Alternatively, the sensors in each pair could be arranged to provide outputs having opposite sense. In such an implementation, the output of one sensor of the pair could be arranged to provide a positive output, and the other sensor of the pair could be arranged to provide a negative output. In this arrangement, the sum of the outputs of the sensors in a given pair, or their mean, would be required to be a constant to within the tolerance threshold.

For joystick systems of the magnetic sensing type, it is therefore necessary to measure the angular position of the joystick shaft (and therefore the magnet) without introducing errors due to the linear motion of the magnet in the three orthogonal directions.

International Patent Application No. WO 2006/013323 A1 describes a control system comprising a magnet, biased to a central upright position and movable about two perpendicular axes by means of a shaft coupled thereto. The magnet is molded within a ball situated in a socket and the ball is surrounded by a pole-piece frame arrangement which lies in a plane that is substantially perpendicular to the axis of the shaft. The pole-piece frame arrangement typically comprises four pole-piece arms arranged with four respective gaps therebetween, the gaps being equally spaced around the magnet. Within each of the four gaps there is provided a Hall effect sensor such that opposing pairs are arranged to detect either forward/aft or left/right deflection of the shaft. In use, the angular movement of the shaft toward a first gap creates a magnetic potential difference within the pole-piece frame, which causes flux to flow symmetrically around the circuit to the diagonally opposite gap of the pole-piece arrangement. Thus, flux lines will flow from the magnet to the pole-piece frame arrangement and from there to the gaps diagonally opposite to the above-mentioned first gap, passing through a Hall effect sensor located in the gap therebetween, thereby generating a signal to activate the desired control. The input conveyed by the user via the shaft is only actioned if the flux measured in one sensor of a sensor pair is also measured to in the second sensor of the same sensor pair to within a tolerance threshold. This multiple sensing provides a fail-safe in the event that one of the sensors of a sensor pair generates an erroneous signal.

BRIEF SUMMARY OF THE INVENTION

While the system described above is highly effective in providing a position measurement function with redundancy for safety checking, particularly suited to safety-critical applications, there is a constant drive to reduce costs. In order to achieve this object, it will be appreciated that there is no need to continue operation of the vehicle if a sensor is determined to have failed, i.e. there is no need to provide for continued "availability" (although this is an option if required). In its simplest form, the aim is to halt operation of the vehicle in the event that a sensor failure is detected.

Thus, it is an object of the present invention to provide a control system for providing a position measurement function with redundancy for safety checking in which the component and, therefore, the manufacturing costs are reduced relative to the above-described arrangement, without compromising safety.

In accordance with the present invention, there is provided a control system comprising:
 a control input device having a movable magnet;
 a pole-piece frame arrangement positioned about the magnet for influencing the flux lines thereof, at least three magnetic flux sensors being positioned in said pole-piece frame arrangement for sensing movement of the magnet, said at least three magnetic flux sensors being substantially equally spaced 120° apart around said magnet,
 a monitoring arrangement for monitoring the output signal of each of said at least three sensors,
wherein a process can be implemented dependent upon the monitored signals of the at least three sensors.

The process may comprise a fail-safe process and/or a control process.

Preferably, said magnet is pivotally movable relative to two perpendicular axes. In a preferred embodiment, one of said magnetic flux sensors is positioned on a first one of said axes such that the output signal (A) thereof is representative of the position of said control input device relative to said first axis (X). In this case, output signals (B, C) of the other two magnetic flux sensors, not positioned on said first axis, are preferably used to determine the position of the control input device relative to the other axis (Y).

In one exemplary embodiment, the position of said control input device relative to said at least two perpendicular axes is used to determine the angular position of the magnet relative to the frame and a control signal dependent on said angular position is generated to facilitate a control process.

It will be appreciated that the position of the control input device relative to the other axis, Y may be calculated by:

$$Y = \frac{1}{\sqrt{3}} \times (B - C)$$

where B and C respectively are the output signals of said other two magnetic flux sensors, not positioned on said first axis (X).

In an exemplary embodiment of the invention, the output signals of all of said at least three magnetic flux sensors, or signals representative thereof, are added together to generate a check value to facilitate a fail-safe process. In this case, preferably, if said check value exceeds zero, or exceeds zero by more than a predetermined threshold value, a signal for implementing a fail-safe process is generated.

Beneficially, the pole-piece frame arrangement comprises a plurality of pole pieces with gaps being provided between adjacent pole pieces, in which gaps said magnetic flux sensors are positioned. In this case, the sensors are preferably sandwiched between spaced facing flanges of the pole-piece frame. Preferably, the control system is configured such that the primary delivery route for magnetic flux to the sensors in respective gaps in said pole-piece frame is via said pole-piece frame arrangement.

Preferably, the pole-piece frame includes flux collector elements disposed more closely to the magnet than the sensors are disposed to the magnet. In this case, the flux collector elements may be substantially planar panels. Beneficially, the planar panel flux collector elements are supported by narrower connection arms of the pole-piece frame arrangement.

The control input device may, for example, comprise a joystick. In this case, the joystick may have a ball mount, the magnet being disposed in the ball.

The magnetic flux sensors may comprise Hall effects sensors.

These and other aspects of the present invention will be apparent from and elucidated with reference to the embodiments described herein.

BRIEF DESCRIPTION OF THE SEVERAL VIEWS OF THE DRAWINGS

Embodiments of the present invention will now be described by way of examples only and with reference to the accompanying drawings, in which.

DETAILED DESCRIPTION OF THE INVENTION

Figure 1:
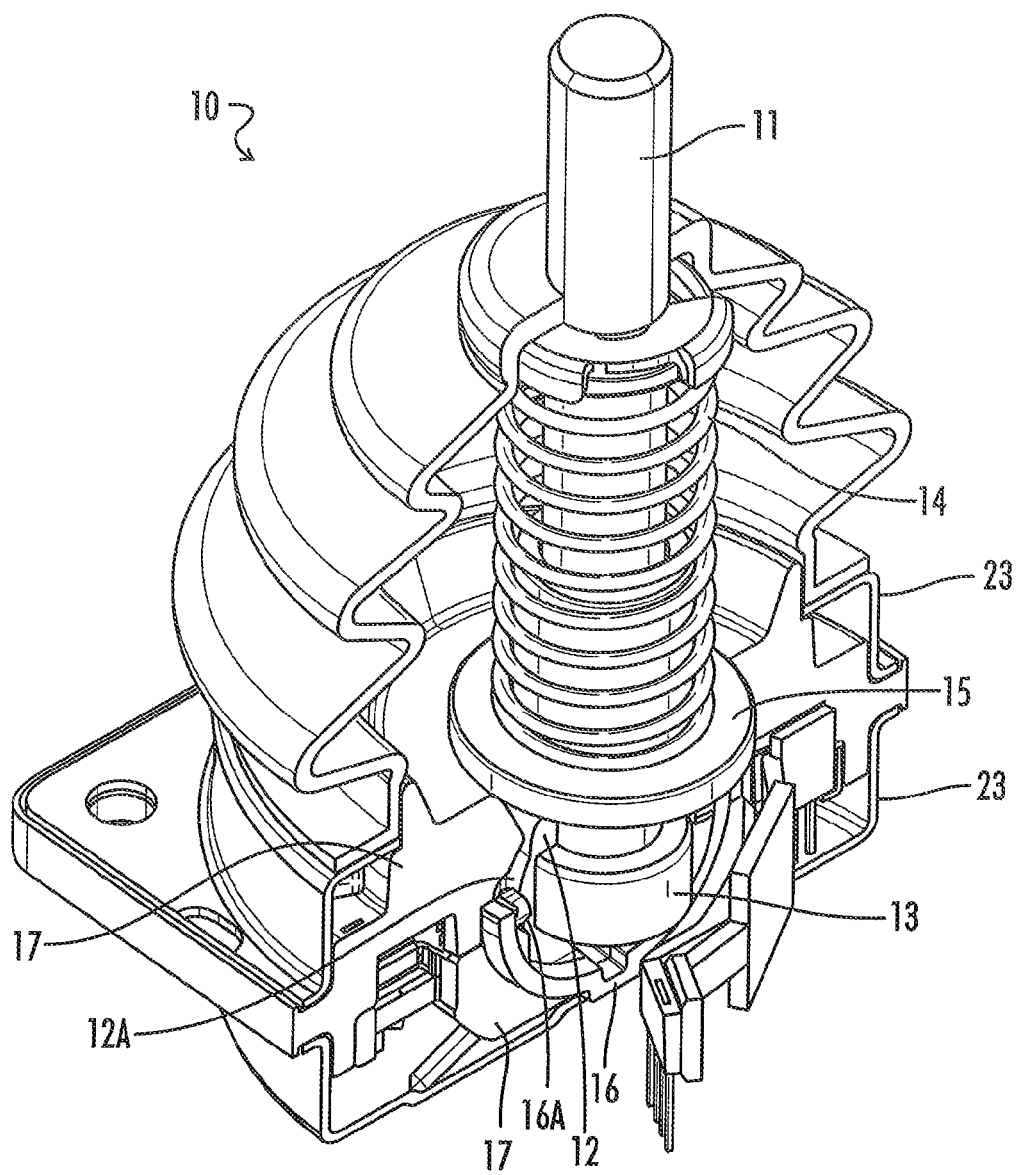
FIG. 1 is a cut-away section of an exemplary device used in the control system of the present invention.

Referring to FIG. 1 of the drawings, the control input device 10 comprises a shaft 11, one end of which is attached to a ball 12, in which is molded a magnet 13 typically neodymium-iron-boron (NdFeB), samarium cobalt (SmCo), ferrite or other permanent magnetic material. The ball 12 is situated in a socket (not shown) and the shaft 11 is biased to the central upright position by means of a spring 14 and sliding bush 15 which may be conical or flat.

The magnet 13 is orientated within the ball 12 such that the axis of magnetization is along the axis of the shaft 11. The ball 12 further comprises two diametrically opposite recesses 16A for accommodating a stirrup clip 16. The clip 16 fits into a matching groove 16B formed on the main body 17 of the input device 10 to prevent the rotation of the shaft 11 about its long axis.

Figure 2:
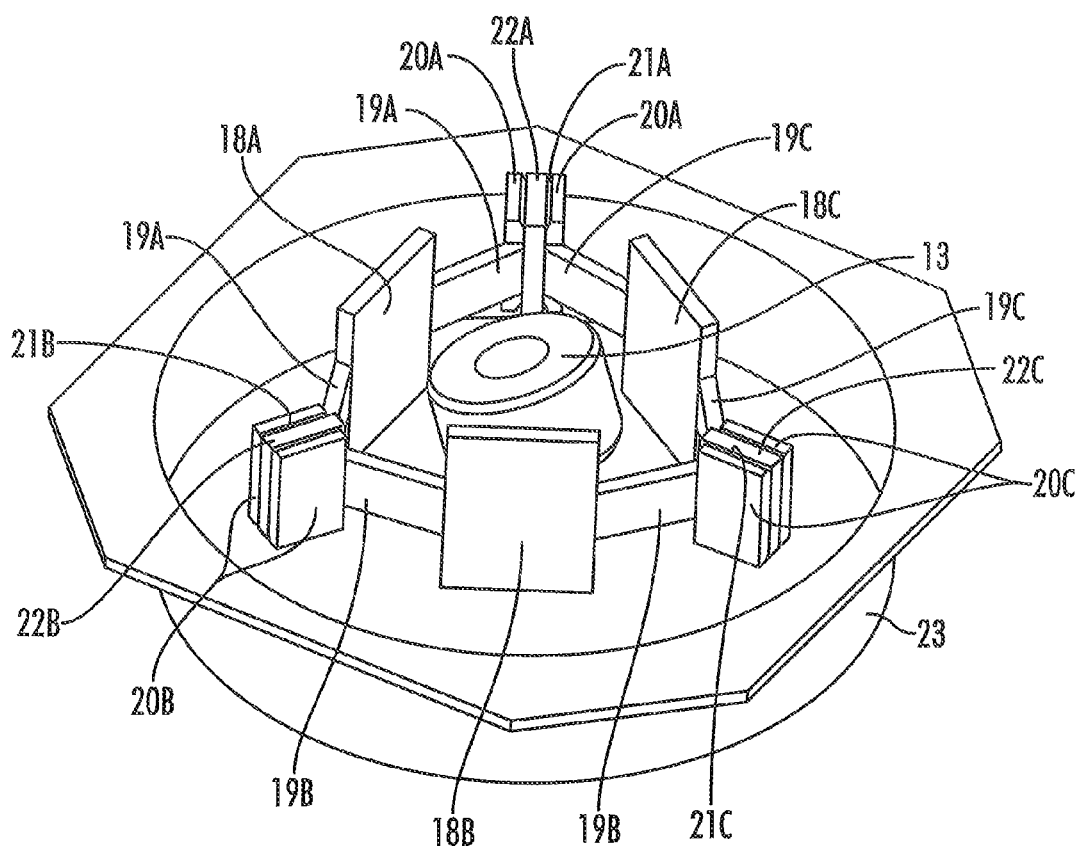
FIG. 2 is a perspective view of a pole-piece frame arrangement relative to a magnet for use in a control device according to an exemplary embodiment of the present invention.

Referring to FIG. 2, the magnet 13 is surrounded by a pole-piece frame arrangement which lies in a frame that is substantially perpendicular to the axis of the shaft. The pole-piece frame arrangement is formed of a material with a high magnetic permeability and comprises three collector plates 18A, 18B, 18C, equally spaced around the magnet 13 supported by four pole-piece arms 19A, 19B, 19C which have a comparatively smaller frame area than the plates 18. The collector plates 18 and arms 19 are orientated such that their respective planes are substantially parallel to the axis of the shaft 11 in its undeflected upright position. The corners of the arms 19 are turned outwardly from the magnet 13 with three pairs of plates 20A, 20B, 20C, forming gaps 21A, 21B, 21C therebetween. In each of the gaps 21, there is placed a respective Hall effect sensor 22A, 22B, 22C.

Figure 4:
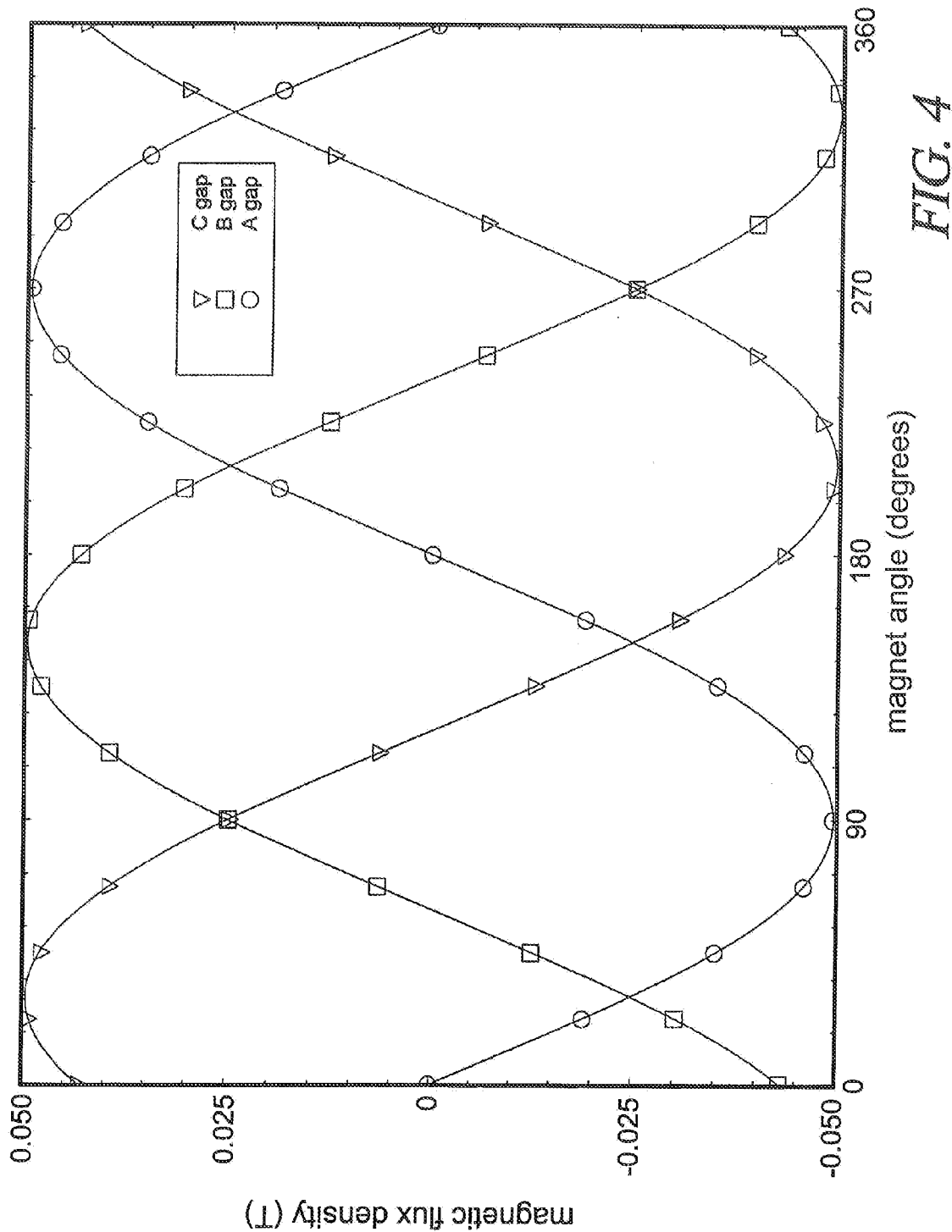
FIG. 4 is a graphical representation of the outputs of each of the three sensors of a control device according to an exemplary embodiment of the present invention.

The arrangement illustrated and described with reference to FIG. 2 produces three outputs A, B, C, that are 120° out of phase relative to the axis of the shaft 11 when it is not displaced, as illustrated graphically in FIG. 4 of the drawings. The shaft 11 is manually deflected by a user in order to produce a desired control signal. The shaft can be deflected relative to two axes, X and Y, which are substantially perpendicular to each other. Thus, the absolute position of the shaft relative to the central upright position is a function of its deflection relative to the X and Y axes and can be expressed as an X,Y coordinate pair.

In general, the magnetic flux density in the mid point of each gap can be approximated by the following formula.

$$\begin{bmatrix} b_1 \\ b_2 \\ b_3 \end{bmatrix} = \begin{bmatrix} k\sin\varphi\cos\alpha \\ k\sin\varphi\cos\left(\alpha - \frac{2\pi}{3}\right) \\ k\sin\varphi\cos\left(\alpha - \frac{4\pi}{3}\right) \end{bmatrix}$$

Where
- $b_1$ is the flux density in the first gap
- $b_2$ is the flux density in the second gap
- $b_3$ is the flux density in the third gap
- k is a constant proportional to the strength of the magnet and inversely proportional to the reluctance of the magnetic circuit
- φ is the angle that the magnet is inclined from its central, upright position (i.e. the axis of rotational symmetry of the magnetic circuit)
- α is the angle between the direction in which the magnet is inclined and the reference direction, measured in the plane of mirror symmetry of the pole-piece frame. It will be apparent that when α is 0 the magnet is being inclined about an axis that passes through the centre of the first gap.

It will be noted that the output is proportional to the sine of the displacement angle. This is approximately linear for small angles, and the inclination of the magnet is typically limited to a maximum inclination of 20°.

Typically the output of the sensors can be represented by the following formula $$\begin{bmatrix} s_1 \\ s_2 \\ s_3 \end{bmatrix} = \begin{bmatrix} g_1 b_1 + n_1 \\ g_2 b_2 + n_2 \\ g_3 b_3 + n_3 \end{bmatrix}$$

Where
- $s_1$ is the output voltage of the sensor in the first gap
- $s_2$ is the output voltage of the sensor in the second gap
- $s_3$ is the output voltage of the sensor in the third gap
- $g_1$ is the gain of the sensor in the first gap
- $g_2$ is the gain of the sensor in the second gap
- $g_3$ is the gain of the sensor in the third gap
- $n_1$ is a constant (the "null offset")
- $n_2$ is a constant (the "null offset")
- $n_3$ is a constant (the "null offset")

Typically $g_1$, $g_2$ and $g_3$ are approximately equal, their value being selected to give a usefully measurable output for the range of flux density to be measured.

Typically $n_1$, $n_2$ and $n_3$ are also approximately equal, and are typically equal approximately to half of the supply voltage of the sensor, so that the output may vary in a positive or negative direction by substantially equal amounts.

The constant offsets are removed to give a signal that is proportional to the flux density in each gap:

$$\begin{bmatrix} A \\ B \\ C \end{bmatrix} = \begin{bmatrix} s_1 - n_1 \\ s_2 - n_2 \\ s_3 - n_3 \end{bmatrix}$$

In the preferred implementation, the two orthogonal axes X and Y are aligned with the reference direction and perpendicular to it, respectively described below with reference to FIG. 3:

$$\begin{bmatrix} X \\ Y \end{bmatrix} = \begin{bmatrix} A \\ \frac{1}{\sqrt{3}}(B - C) \end{bmatrix}$$

However, if it is preferred to have an alternative reference direction, the coordinates (X, Y) can be rotated into coordinates (X', Y') in a new reference frame at a clockwise angle θ to the first reference frame and with a common origin (0,0), using the following formula.

$$\begin{bmatrix} X' \\ Y' \end{bmatrix} = \begin{bmatrix} \cos\theta & -\sin\theta \\ \sin\theta & \cos\theta \end{bmatrix} \cdot \begin{bmatrix} X \\ Y \end{bmatrix}$$

It will be clear to those skilled in the art that since the angle of rotation between the reference frames is constant, the values of sine and cosine used in the rotation formula can be predetermined.

Figure 3:
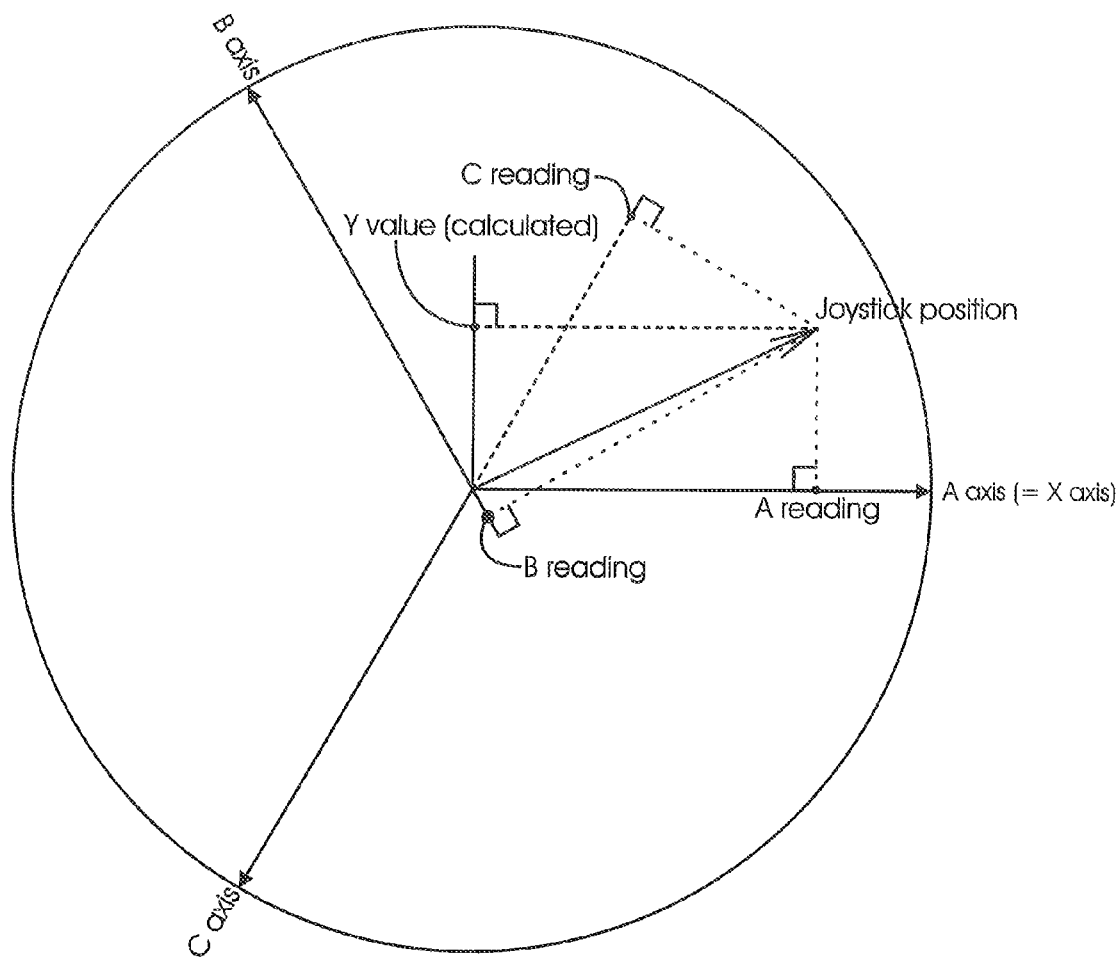
FIG. 3 is a diagram illustrating the principle of axis decoding employed in a control device according to an exemplary embodiment of the present invention.

Referring to FIG. 3 of the drawings, in a preferred embodiment, one of the axes, say X, is aligned with one of the gaps, say 21A. Thus, movement of the shaft relative to the X-axis produces a change in flux in gap 21A which is proportional to the deflection of the shaft relative to the X axis. Thus, the position of the shaft relative to the X-axis (i.e. the X-axis value of the X,Y coordinate) can be determined directly from the signal produced by the Hall effect sensor in gap 21A. The Y-axis value can then be calculated from the sensor readings at the two remaining gaps, 21B and 21C:

$$Y = \frac{1}{\sqrt{3}} \times (B - C)$$

For the purposes of the present invention, it is necessary to sense magnetic fields that are going in either direction through the sensors, and to produce an output that is proportional to the intensity of the field. Each sensor output should be zero when there is no flux, and for it to produce a positive or negative output depending on the direction of the flux. As will be known by a person skilled in the art, once the output voltage of a sensor has been measured by the controller, a so-called null offset is subtracted to produce a value that is truly proportional to the flux, with a positive or negative value appropriate to its direction and strength.

Thus, error checking is also relatively simple. After the null offsets are removed, the sum of the three sensor outputs should always be zero. Thus, in the event of failure of one of the sensors, or an erroneous sensor output from one of the sensors, the sum of the three sensor outputs will be non-zero. In this case, a fail-safe process would be implemented whereby no control signal corresponding to the X,Y position data will be generated and the system being controlled by the input device will be disabled. Practically, there will need to be a tolerance threshold that allows for small non-zero values, but this is relatively simple to facilitate. Thus, detection of faults is also relatively simple. After the null offsets are removed, the sum of the three sensor outputs should always be zero. Thus in the event of failure of one of the sensors, or an erroneous sensor output from one of the sensors, the sum of the three sensor outputs will be non-zero. In this case a fail-safe process would be implemented whereby no control signal corresponding to the X, Y position data will be generated and the system being controlled by the input device will be disabled. Practically, there will be slight variations in the sensitivity of the sensors, and there will need to be an allowance for small non-zero values of the sum of the sensors. In practice, this is done by accepting the sensor outputs if the magnitude of their sum is less than a certain limit and rejecting them if it is greater than that limit for more than a predetermined period of time. This operation has to be carried out separately for each pair of sensors in a known joystick design, whereas in the present invention only a single calculation is required.

The magnetic sensing arrangement may be enclosed within symmetric screening cans 23. The cans 23 ensure that when the joystick is in the zero, upright position, any flux flowing from the pole-piece to the screening cans 23 does not pass through the sensors (or at least, is minimized). Once the upper and lower cans are introduced into an effective proximity to the magnetic pole-piece arrangement, the pole-pieces which deliver the flux to the sensors all remain at the same magnetic potential with respect to each other. As a result, when the joystick is in the upright position, the flux circulating through the sensors is minimized. In addition, the cans 23 provide mechanical stability and help to reduce any magnetic flux external to the cans 23 from entering the magnetic sensing arrangement and affecting the sensor outputs.

In the embodiments described, the pole-piece frame arrangement acts as the primary conduit to pick up and divert magnetic flux across the Hall effect sensors.

It will be apparent that there are significant component cost savings as a result of the design of the present invention, in that one sensor and its associated components can be eliminated. In addition, because there are only three (rather than four) pole pieces, less material is required to manufacture the pole-piece frame arrangement. Thus, the cost of the overall device can be significantly reduced without compromising safety.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The words "comprising" and "comprises", and the like, do not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

Thus, although there have been described particular embodiments of the present invention of a new and useful "Control System and Method for Providing Position Measurement with Redundancy for Safety Checking", it is not intended that such references be construed as limitations upon the scope of this invention except as set forth in the following claims.

What is claimed is:

1. A control system comprising:
a control input device having a pivotally movable magnet relative to two perpendicular axes (X) and (Y);
a pole-piece frame arrangement positioned about the magnet for influencing the flux lines thereof, three magnetic flux sensors being positioned in said pole-piece frame arrangement for sensing movement of the magnet, said three magnetic flux sensors being substantially equally spaced 120° apart around said magnet, one of said magnetic flux sensors positioned on a first one of said axes (X) such that an output signal (A) thereof is representative of the position of said control input device relative to said first axis,
a monitoring arrangement for monitoring the output signal of each of said three sensors and further effective to calculate the position of the control input device relative to the second axis (Y) by:

$$Y = \frac{1}{\sqrt{3}} \times (B - C)$$

wherein (B) and (C) respectively are the output signals of said other two magnetic flux sensors, not positioned on said first axis,
generate a check value by summing the output signals of all of said three magnetic flux sensors, or the representative signals thereof, and
generate a signal effective to implement a fail-safe process when said check value exceeds a predetermined threshold value.

2. A control system according to claim 1, wherein the position of said control input device relative to said at least two perpendicular axes is used to determine the angular position of the magnet relative to the frame and a control signal dependent on said angular position is generated to facilitate a control process.

3. A control system according to claim 1, wherein said pole-piece frame arrangement comprises a plurality of pole pieces with gaps being provided between adjacent pole pieces, in which gaps said magnetic flux sensors are positioned.

4. A control system according to claim 3, wherein the sensors are sandwiched between spaced facing flanges of the pole-piece frame.

5. A control system according to claim 1, wherein the primary delivery route for magnetic flux to the sensors in respective gaps in said pole-piece frame is via said pole-piece frame arrangement.

6. A control system according to claim 1, wherein the pole-piece frame includes flux collector elements disposed more closely to the magnet than the sensors are disposed to the magnet.

7. A control system according to claim 6, wherein the flux collector elements are substantially planar panels.

8. A control system according to claim 6, wherein the planar panel flux collector elements are supported by narrower connection arms of the pole-piece frame arrangement.

9. A control system according to claim 1, wherein the control input device comprises a joystick.

10. A control system according to claim 9, wherein the joystick has a ball mount, the magnet being disposed in the ball.

11. A control system according to claim 1, wherein the magnetic flux sensors comprise Hall effects sensors.

* * * * *